June 6, 1939.  W. W. ROWE  2,161,092
PROCESS AND MACHINE FOR MAKING COMPOSITE CREPED PRODUCTS
Filed Aug. 5, 1935   2 Sheets-Sheet 1
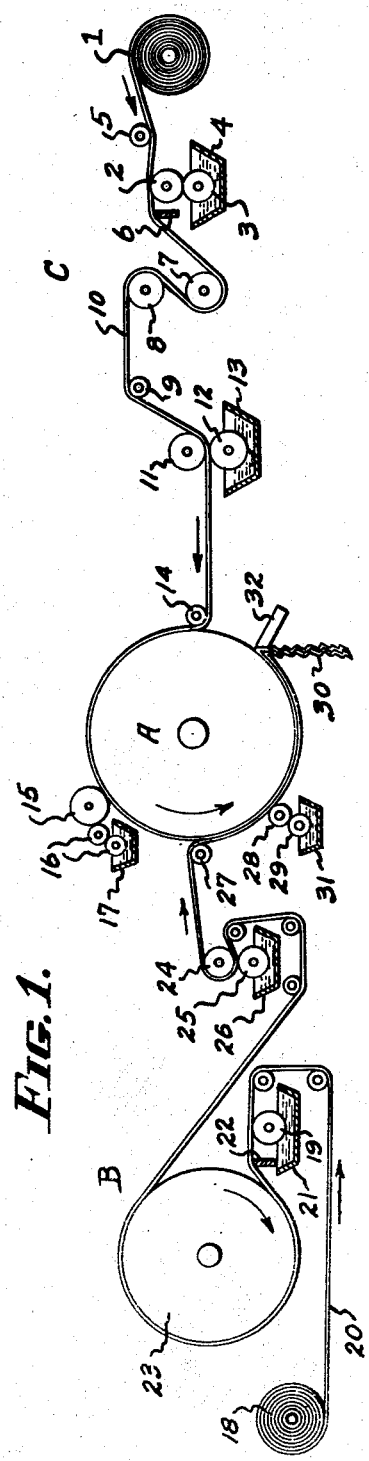
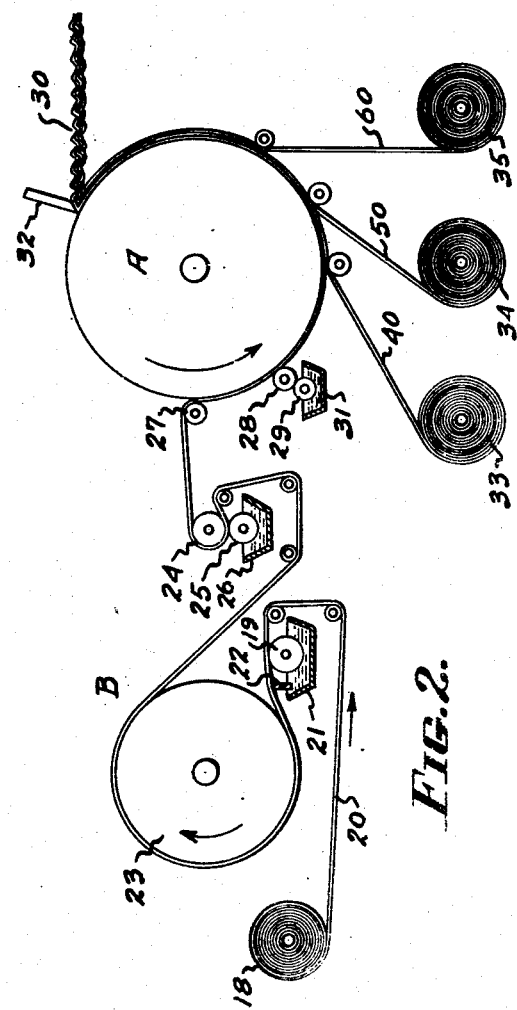
INVENTOR.
WILLIAM WALLACE ROWE.
BY Allen + Allen
ATTORNEYS.

June 6, 1939. W. W. ROWE 2,161,092
PROCESS AND MACHINE FOR MAKING COMPOSITE CREPED PRODUCTS
Filed Aug. 5, 1935 2 Sheets-Sheet 2

INVENTOR.
WILLIAM WALLACE ROWE
BY Allen & Allen
ATTORNEYS.

Patented June 6, 1939

2,161,092

UNITED STATES PATENT OFFICE 2,161,092

PROCESS AND MACHINE FOR MAKING COMPOSITE CREPED PRODUCTS

William Wallace Rowe, Cincinnati, Ohio, assignor to The Paper Service Company, Lockland, Ohio, a corporation of Ohio Application August 5, 1935, Serial No. 34,689

13 Claims. (Cl. 154—33)

In this application I shall describe and claim an apparatus and process for making multi-ply creped products, to exemplary ones of which I shall hereinafter refer. Certain of these products are described and claimed by me in certain companion cases filed of even date herewith, entitled Creped products including translucent films, Ser. No. 34,686, and Creped articles including metallic foils, Ser. No. 34,688.

A fundamental object of my invention is the provision of a machine and process for the continuous lamination of webs and the creping of the laminated structure.

Another object is the provision of a machine and process for laminating webs upon a creping cylinder.

Still another object is the provision of a laminating and creping machine and process permitting individual treatment of the webs for special purposes as will hereinafter be set forth.

Still another object is the provision of a machine and process for building up one or more laminations of a laminated structure from webs which are of less than the full width of the structure.

These and other objects of my invention which will be apparent to one skilled in the art upon reading these specifications, I accomplish by that certain construction and arrangement of parts of which I shall now describe certain exemplary embodiments. I shall describe these exemplary embodiments in connection with the manufacture of certain illustrative products, and in connection with the employment of a particular creping process which is to be distinguished from water creping processes in that reliance, for the attachment of the web or webs to the creping surface, is had on a body of material which is adhesive per se. It will be understood, however, that neither the exemplary embodiments of apparatus or process, the illustrative uses described, nor the particular creping method employed constitute limitations upon my invention, the invention not being limited excepting as specifically set forth in the appended claims.

Reference is now made to the drawings wherein:

Figure 1 is a diagrammatic elevational view of an exemplary machine embodying my invention.

Figure 2 is a similar view of a machine or portion thereof designed for making up one lamina at least of a plurality of sidewise disposed narrower webs.

Figure 4:
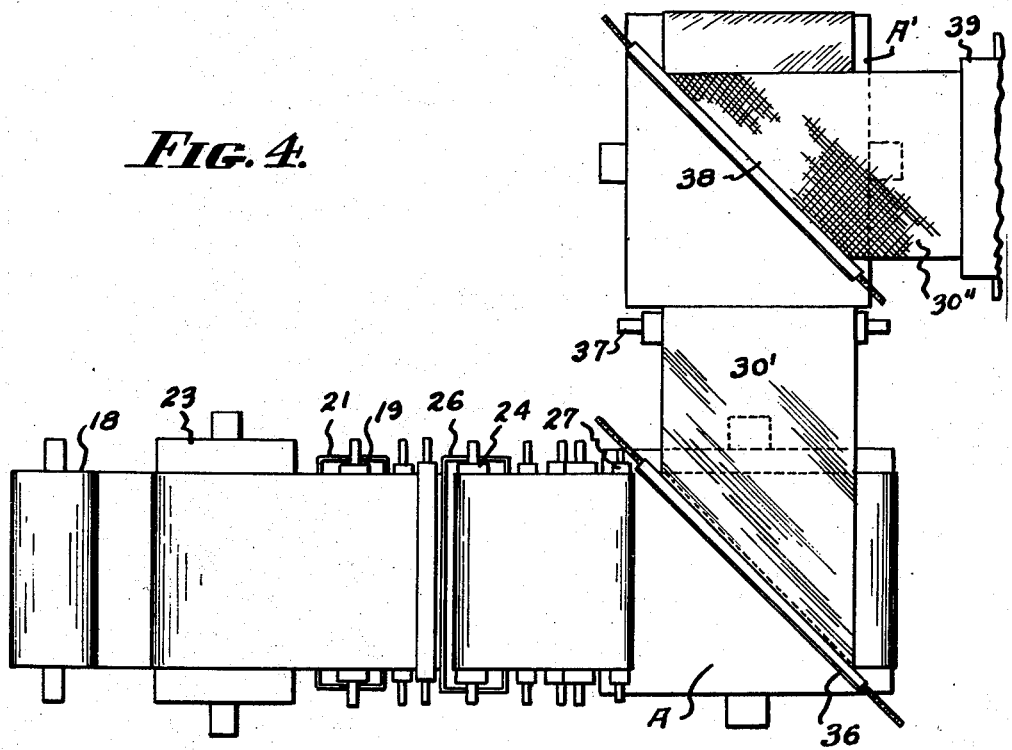
Figure 4 is a plan view of the apparatus of Figure 1, with the second creping mechanism and an embossing mechanism added.

Essentially in the practice of my invention, I provide a plurality of webs which may be regarded individually as single laminations, or as going to make up a single lamination, and I individually treat these webs and combine them upon a creping cylinder, creping the webs thereon. I shall describe an apparatus capable of carrying on this process but also capable of the creping of individual webs as has been done in the past.

In Figure 1, I have shown a creping cylinder at A, and at B and C assemblies of apparatus for treating individual webs to be combined upon the cylinder A and creped thereon. It will be understood that not all parts of the apparatus which I shall describe need necessarily be used in every creping and/or combining operation, and also that various parts of the apparatus may be multiplied as desired, for special purposes. In Figure 1 in the assembly of apparatus indicated at C, I have shown a web say of paper, being withdrawn from a roll 1. This web passes over a coating apparatus comprising a coating roll 2, and pick-up roll 3, turning in a pan 4. An idler roll 5 may be used to hold the web in contact with the coating roll 2, and I have shown at 6, a doctor for controlling the thickness of the coating on the web. The web may then be passed around rolls 7 and 8 or their equivalents, which portion of the apparatus may effect either a drying of a coating applied to the web, or a temperature control thereof. The rolls 7 and 8 may be provided with heating and/or cooling means, and in the equivalents therefor, I include festooning devices or the like, where in any particular treatment these are desired. An idler 9 may serve to lead the web (which is indicated at 10), between coating rolls 11 and 12, one of which turns in a pan 13 of coating substance. Since the rolls 11 and 12 are pinch rolls, no doctor will be necessary to control the thickness of the coating. The web 10 is next pressed against the surface of the cylinder A by means of a backing-up roll 14. The roll A is shown turning in a counter-clockwise direction and the web after having been secured to the surface of the roll, may be treated as by a coating operation. I have indicated an applying roll 15, and pick-up rolls 16 turning in a pan 17 of coating substance. A second web 20 may be withdrawn from a roll 18, and coated by a roll 19, turning in a pan 21 of coating substance. I have indicated a doctor at 22. The web may then be passed about the surface of a cooling or heating and/or drying drum 23, and then coated as by means of rolls 24 and 25, the lower one of which turns in a pan 26 of coating substance. This web 20 will then be led to the creping cylinder A and pressed there-against as by a back-up roll 27. I have indicated another treatment device comprising an application roll 28, and a pick-up roll 29 turning in a pan of coating substance 31. This may be used to treat the outer surface of the duplex web now formed upon the surface of the cylinder A. The composite web may be removed from that surface and creped as by a doctor, which I have indicated at 32; and the creped duplex web is indicated at 30.

In connection with the operation of an apparatus of this character, it will be seen first that individual webs are serially brought against the surface of the cylinder A, with individual treatment for the webs, and are laminated on that surface, the final laminated product being creped. This is a convenient operation and does away with the necessity of a great deal more apparatus. More especially it is of advantage where certain of the individual treatments practiced on the webs produce effects of an evanescent character, so that to combine in one place and crepe in another, might be destructive of these effects.

It will be understood first that while I have shown two assemblies of individual treatment apparatuses, indicated broadly at B and C, these assemblies may be multiplied by any reasonable number depending upon the number of webs which it is desired to laminate, and the creping capabilities of the final laminated product.

Second, it will be understood that not all of the individual treatment apparatuses, nor all those apparatuses which treat the combined laminated product, need be used in any one operation. The machine, in effect, is a flexible apparatus capable not only of novel process use, but also of usages which have hitherto been carried on with apparatus old in the art, so far as my present invention is concerned.

I will now describe certain exemplary operations which can be carried on by the machine of Fig. 1. If it is desired to crepe a single ply web, either the web 10 or the web 20 may be used, and consequently either the apparatus assembly C, or the apparatus assembly B. If the apparatus assembly C is used, the web may be twice pressed against the creping cylinder A, as by the rolls 14 and 27. Assuming, for example, that it is desired to use the apparatus assembly B, the web 20 may be a web of paper withdrawn from the roll 18. It may be coated with asphalt by either the first or second coating apparatus, which I have shown and described, and then pressed against the surface of the cylinder A, and creped in accordance with the teachings of my reissue patent, Reissue No. 17,633. Or it may be coated with asphalt or other coating of thermoplastic character, or with emulsions, solutions, etc., or with cellulose lacquers, by means of the roll 19, and then passed about the surface of the cylinder 23, which may be operated as a heated cylinder so as to cause the absorption of the coating into the paper, or so as to dry and set the coating. Then it may be coated with the creping adhesive, and passed therefrom directly to the creping cylinder A. Again, the roll 19 may be used to apply an anti-staining substance to the web, such, for example, as rubber latex, and the cylinder 23 may be used for the purpose of drying and coagulating the latex, after which the web 20 would be coated with the creping adhesive on the rolls 25 and 24. The web 20, instead of being a web of paper as described, may be a metal foil, a cellulose film, any of the other films which are transparent, such as the recently manufactured "pliofilm", which is a rubber derivative, or the like.

I have shown the coating instrumentalities arranged to coat but one side of each web. It will be within the skill of the worker in the art, of course, so to arrange them as to coat both sides of a web. Thus a single web may be coated with asphalt, for example, upon both sides, and one of the sides treated to render it non-tacky, as by being coated with talc, or covered with thin tissue, before or simultaneously with its juncture with the creping surface. Plural ply webs may also be made in this way.

Again, it is practicable to coat one side of a single or multiply web with the creping adhesive, temper or treat this adhesive as desired, then lead the web to the creping cylinder. Afterward, when the web is on the cylinder, and prior to creping, its outer surface may be coated with the same or a different coating substance, by means hereinafter to be described, and protected or not prior or subsequent to creping.

When making duplex or multiplex sheets, each web may be individually treated in any way desired. One difficulty, however, which is usually encountered when creping duplex webs by means of a thermo-plastic adhesive, such as asphalt, is that it is difficult to moisten both webs because one of the webs is sealed between two layers of adhesive. Moreover, it is difficult to moisten a web before applying an asphaltic creping adhesive because of the high temperatures at which the adhesive is normally applied. While these difficulties do not arise where water bearing adhesives, such as glues or rubber latex are employed, yet the softening of a web by means of water or moisture applied thereto, while it may have little or nothing to do with the adherence of the web to the creping cylinder where positive adhesives are employed, nevertheless is of importance in the creping step by reason of its softening function, which permits creping under some circumstances where it would otherwise be impossible, and in all instances tends to permit a finer and more uniform creping, and the retention of higher percentages of stretch.

Moreover, there are a number of webs which I may crepe which are substantially impenetrable and which, if laminated to other webs, would prevent the treatment thereof with liquids. Such webs are some of the translucent or transparent films, and metal foils. Metal foils have, however, the ability when creped to retain the creases of the creping crinkles by reason of their non-resilience; and in creping metal foils laminated to other materials it is frequently desired to soften these other materials for reasons which will be plain.

When using the machine of my invention, this problem may be solved by an individual water treatment of any of the webs, usually subsequent to the asphalt application, but prior to the combining of the webs to make up the duplex or multiplex sheet. For example, when forming duplex paper on the machine of Fig. 1, the webs 10 and 20 may first be coated with a thermo-plastic adhesive by means of the rolls 12 and 25, respectively. Then each web may be individually softened by means of water applied on the rolls 14 and 27 respectively, or rolls 15 and 28 respectively. When making a duplex sheet, the roll 15 may be employed to coat the first layer of paper already applied to the creping cylinder A, with a suitable laminating adhesive of any type desired. The second web 20, with or without coating, is then applied over this adhesive as shown, and is laminated thereto. The roll 28 may be used for a variety of purposes, such for example, as coating the upper surface of the web with any desired coating including coloring substances, water-proofing substances, chemical-proofing substances or various substances to produce decorative effects. Likewise the cylinder 28 may be a printing cylinder to produce either legible indicia or decorative effects. The coating apparatus involving the roller 28 may be multiplied, which many times is desired for special effects.

Variants of the adhesive applications may be practiced as desired. Thus two laminae or a lamina and the creping surface may each be coated with latex, and the dispersion allowed fully to dry and coagulate. Afterward such treated surfaces may be caused to adhere by merely bringing them together under such pressure as will cause even contact. My apparatus is clearly adaptable to this.

Again latex or other adhesive of a more or less liquid consistency may be applied either to a web, or direct to the creping surface, and one or more layers of cellulose wadding pressed thereon. Afterward the product may be creped. Also creped articles may be coated with adhesive and one or more layers of cellulose wadding pressed thereon.

I have found it possible in accordance with my invention to produce novel, unusual and highly useful products, as is more completely set forth in the companion applications to which I have referred, by the juncture to backing substances of webs of thin transparent material, such as Cellophane, "pliofilm" and the like, or webs of metal foils. Under these circumstances, although it is possible to crepe these substances alone, creped products are secured which have greater body, greater strength and greater durability. If the web 20, for example, were a web of transparent substance, it would be especially advisable to treat the web 1, on the roll 2, with a stain preventing substance, then to coat it with the creping adhesive on the roll 12. Afterward the coating device involving the roll 15, could be used either to decorate the surface of the paper web or to apply the laminating adhesive. If the roll 15 is used to decorate the surface of the web, as by imprinting thereon designs or colors, it will be clear that as many of these devices as may be necessary for the particular purpose may be used, and also it will be clear that a separate coating device may be employed to apply the laminating adhesive, which in this case will preferably be a transparent adhesive.

The transparent film 20, colored or not as desired, is then applied over the paper web and laminated thereto, and the composite product creped. The surface of the transparent web may be additionally decorated or treated by the roller 28, or any multiple of that coating apparatus. It has already been indicated that the web 20 may be any one of the commercially available metal foils, which foils may or may not be lacquered, printed or decorated on the surface which will automatically be exposed.

I have further indicated that the operation of my machine is not restricted to any given creping process, such as one using a positive creping adhesive, although a positive adhesive process will be found of advantage where the laminated product to be creped is fairly thick or heavy. The individual treatment apparatuses and those which apply coating materials to webs on the creping cylinder A, may be used to apply a great variety of substances, and adhesive or not as desired, and including but without limitation, water, bitumen, glue, latex, resins, varnishes, lacquers, emulsions, anti-stain substances, printing and decorative materials, bronze and the like. The temperatures of any of the rolls may be controlled to give particular treatments as required, of any of these applied substances, and the webs may, where desired, be passed in the course of processing, through chambers where other special treatments including temperature and humidity treatments, chemical treatments and the like may be effected thereon. In this way I am able to produce highly decorative materials suitable for many uses and extending into fields not hitherto entered by creped webs.

It frequently happens that some of the materials which it is desired to laminate to a body web are of less than the required width, and this is particularly true of certain commercially available metallic foils. I have indicated in Figure 2 an apparatus which may be regarded either as a modification of the apparatus of Figure 1, or as a disclosure of additional elements which may be applied thereto. The creping cylinder is again indicated at A, and an individual web treatment assembly at B. This latter assembly may be used to treat a web of paper where such web is desired for the body material, and after this paper has been pressed by the roll 27 against the surface of the cylinder A, it may be coated with a laminating adhesive by means of the roll 28. Thereafter a plurality of strips of metal foil for example, indicated at 40, 50 and 60, may be led thereagainst, the edges of these strips either being butted or caused slightly to overlap so as to give a laminated product in which the entire surface is covered with the metal foil, although several pieces thereof may be necessary to make up the width of the desired laminated article. The foil strips may be withdrawn from supply rolls 33, 34 and 35, and it is likewise possible to apply to the surfaces thereof, additional adhesives if this is desired, before the application of the webs to the body substance upon the creping cylinder. In this way I am able to make foil covered laminated articles or articles covered with Cellophane, "pliofilm" or "protectoid", where these covering materials cannot be obtained to the full width of the desired laminated product.

Figure 3:
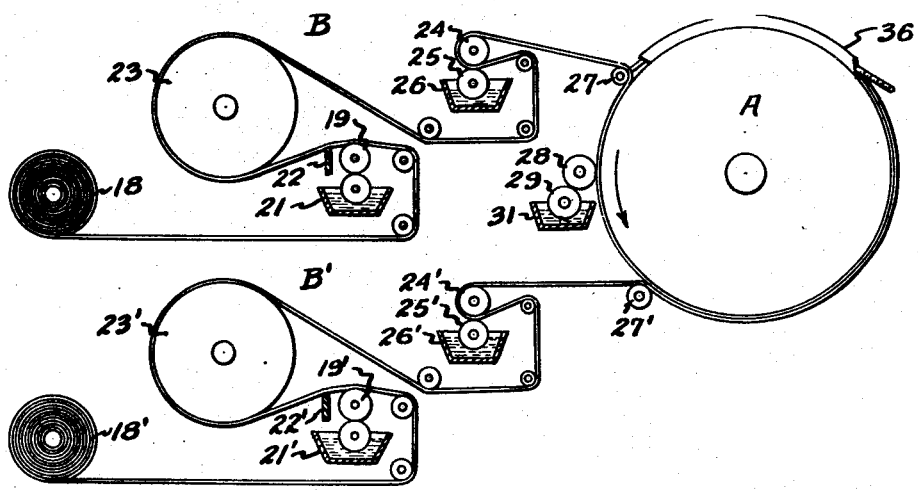
Figure 3 is a diagrammatic elevational view of a modification of the apparatus of Figure 1, designed for forming a universally stretchable laminated web.

In Figures 3 and 4, I have indicated an apparatus embodying my present invention, but designed for the production of multi-laterally stretchable creped webs. Again, the creping cylinder is indicated at A, and an assembly of individual web treatment appears at B. A similar assembly of individual web treatment apparatus is indicated at B¹. A first web may be treated by the assembly B, and pressed by the roll 27 against the surface of the creping cylinder A. A layer of laminating adhesive may be applied thereto by the roll 28. Next a second web may be treated in the apparatus B' and applied against the first mentioned web by the roll 27'. The duplex web may then be creped and removed from the cylinder A by a doctor 36 disposed at an angle to the path of travel of said web as set forth in the patent to William C. Kemp entitled the Art of producing multi-lateral stretchability in paper webs or the like, No. 2,008,181 issued July 16, 1935. This produces in the web a series of diagonally arranged creping crinkles. The single diagonal creped web now indicated at 30' in Figure 4 may next be conducted to the surface of a second creping cylinder A' and pressed there against by means of a back-up roller 37. It is removed from the surface of this cylinder again by a diagonally disposed knife 38, also in accordance with the teachings of the said Kemp application. This knife produces in the surface thereof, an oppositely arranged set of diagonal crinkles. Both crinkle operations serve to contract the web widthwise and the final product indicated at 30'' will be universally stretchable.

Universally stretchable single, duplex or multiplex webs made in accordance with the teachings of the said Kemp are easily embossed by reason of their universal stretchability. It has been found that such embossing tends to render invisible otherwise apparent defects, seams or folds which might mar the general appearance of the webs, and also to render invisible joints between webs going to make up a single lamination such as the webs 40, 50 and 60 of Figure 2. Consequently, I have indicated at 39 a pair of embossing rollers which may be used if desired, for the purpose described, and also for the purpose of giving to the universally stretchable web, additional decorative surface configurations.

The indicated apparatus of Figures 3 and 4 is again capable of modification without departing from the spirit of my invention. Especially is it susceptible to modifications in accordance with the teachings of Figs. 1 and 2, but also to multiplications of the various parts to produce all of those treatments which I have hereinabove described.

My apparatus lends itself to the creping of materials which require special treatments, or which, for example, must not be subject to great pressures. Thus, after one or more laminae have been bound to the surface of the creping cylinder, a different material may be placed on said laminae under carefully controlled conditions, and the whole creped. Velour papers may be adhered to a foundation web and creped in this way without loss of nap, making a product which is entirely new—namely, a creped velour. Likewise flocking materials may be applied to laminae previously secured to the creping surface, and the whole creped, making a product which is quite different from what would be produced if it were attempted to flock a previously creped sheet.

Having thus described my invention, what I claim as new and desire to secure by Letters Patent of the United States, is:

1. In combination, a creping cylinder and a creping knife, means for individually coating a plurality of webs with adhesive substances, means for leading said webs at interspaced points to said cylinder and against each other and means for pressing said webs against said cylinder so as to form a composite web thereon, said doctor being shaped to produce creping crinkles in said composite web at other than a right angle to its major axis, a second creping cylinder, means for pressing said composite web into contact therewith, and a second creping doctor shaped to produce creping crinkles in said composite web at other than a right angle to its major axis, said last mentioned crinkles being directed oppositely to said first mentioned crinkles.

2. In creping apparatus the combination of means providing a moving creping surface, a creping doctor, at least one individual coating means for a web, means for pressing said web against said creping surface and means for thereafter covering a desired portion of the surface of said web with other juxtaposed webs of lesser width, while said first mentioned web is on said surface and in advance of said doctor.

3. A process of forming and creping composite webs which comprises individually treating a web so as to soften said web with water, and coating said web upon one side at least with a positive adhesive, pressing said web against a creping surface with said adhesive lying therebetween, individually softening another web with water and leading said web against said first mentioned web on said creping surface with the interposition of an adhesive therebetween, and afterwards removing the composite web so formed from the creping surface by means of a doctor, so as to form crinkles therein.

4. A process of forming and creping composite webs, which comprises individually applying adhesive to a web and causing it thereby to adhere to a creping surface, individually applying material to a second web and thereafter causing it to adhere to said first mentioned web on said creping surface, so as to form a composite product, applying material to the surface of said composite product while on said creping surface and afterward removing said composite web from said creping surface so as to crepe the same.

5. A process of forming and creping composite webs which comprises applying an adhesive to a foundation web and bringing said web into contact with a creping surface, said adhesive being disposed therebetween, applying material to the surface of said web while on said creping surface and thereafter bringing another web thereagainst, finally removing said webs which form a composite product from said creping surface by means of a doctor, whereby to form crinkles therein.

6. A process of forming and creping composite webs which comprises coating a foundation web with adhesive upon one side, leading said web against a creping surface with said adhesive positioned therebetween, printing the surface of said web while on said creping surface, coating a web of translucent material with an adhesive, and leading said web against said first mentioned printed web while on said creping surface with said adhesive positioned therebetween, so as to form a composite web, and removing said composite web from said creping surface by means of a doctor, whereby to form crinkles therein.

7. A process of producing creped, napped webs which comprises binding a web to a creping surface, thereafter affixing to said web a napped material, and then creping the composite fabric thus formed.

8. A process of producing creped, napped webs which comprises binding a web to a creping surface, applying adhesive and a flocking material thereto, and then creping said web.

9. Creping apparatus, comprising, in combination a creping cylinder, a creping doctor against which said cylinder turns, and means interspaced about the surface of said cylinder for leading thereto, individually, a plurality of webs to be creped, whereby said webs may be brought to said cylinder successively and combine thereon in advance of said creping doctor, and crepe thereby together.

10. Apparatus as claimed in claim 9, including treatment means for applying material to said webs individually in advance of the points at which they are brought to said cylinder.

11. Apparatus as claimed in claim 9, including treatment means for applying material to said webs individually in advance of the points at which they are brought to said cylinder, and means associated with said cylinder for applying material to at least one of said webs after it has been brought to said cylinder.

12. A process of forming and creping composite webs which comprises individually applying material to at least one of a plurality of webs and bringing said webs successively against a creping surface so as to build up a composite web thereon, with the interposition of adhesives between the webs, coating the surface of said composite web and finally crinkling said composite web by removing it from said surface with a doctor.

13. A process of forming composite webs and creping the same, which comprises securing a backing web to a creping surface provided with a creping doctor, and affixing to the exposed surface of said web a plurality of webs of lesser width in sidewise but juxtaposed relationship, while said first mentioned web is on said surface and in advance of said doctor.

WILLIAM WALLACE ROWE.